July 6, 1965
W. E. SLAVENS
3,192,694
CORN HARVESTER
Filed May 16, 1963
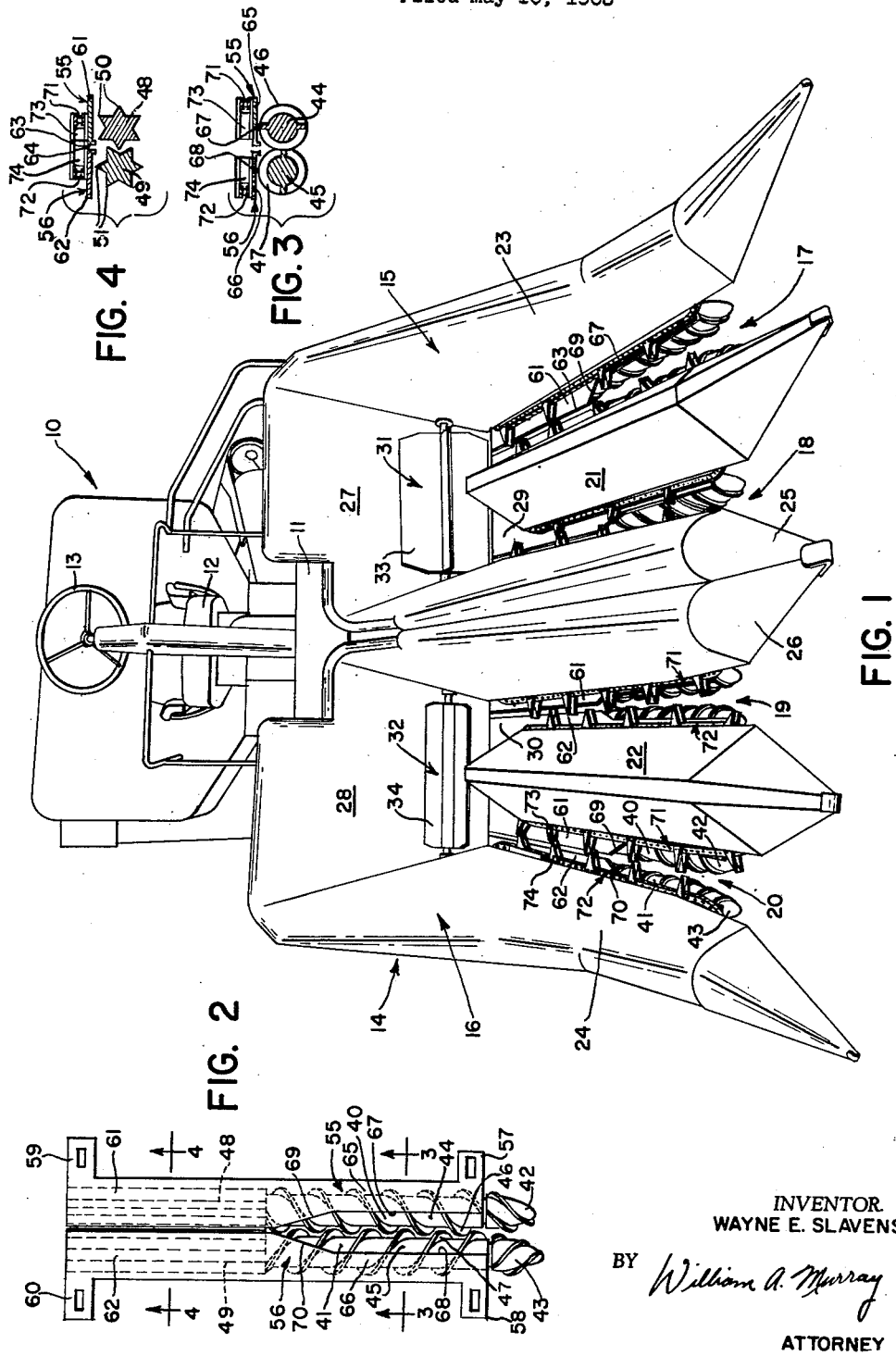
INVENTOR.
WAYNE E. SLAVENS
BY William A. Murray
ATTORNEY 3,192,694
CORN HARVESTER
Wayne E. Slavens, Des Moines, Iowa, assignor to Deere & Company, Moline, Ill., a corporation of Delaware
Filed May 16, 1963, Ser. No. 280,997
6 Claims. (Cl. 56—106)

This invention relates to a corn harvester and more particularly to a type of corn harvester utilizing a snapping bar structure with snapping rolls positioned beneath the snapping bars. Still more particularly, this invention relates to the combination of snapping bars and snapping rolls with a rear discharge type of harvester.

In a conventional type corn harvester there is provided a housing structure having a fore-and-aft extending stalk receiving passage with a pair of rotating rolls on opposite sides of the passage operating to draw the stalks downwardly until the ears are snapped upon contact with the rolls or snapping bars positioned above the rolls. In operation this type of ear detachment requires certain compromises in its functions. For example, it is desirable to move over a field at a relatively high rate of speed and also at the same time completely detach all ears from the stalks. Consequently it has become necessary to provide a spiral rib on the surface of the rolls that operates to auger the stalks rearwardly while at the same time drawing the stalks downwardly. However, to properly auger the material there must be spacing and consequently the aggressive characteristics of the rolls are somewhat reduced. Entering into proper operation of the snapping rolls is the desire to minimize premature shelling that occurs when a relatively dry ear of corn strikes a metal part and dislodges kernels from the ear. This incidental shelling results in the kernels often being deposited on the ground which not only causes a loss of revenue at the time of harvesting, but also creates further problems the following year when the fallen kernels operate as seeds and germinate into new stalks.

With the above in mind, it is the object of the present invention to provide a new and novel type of corn harvester which utilizes a pair of opposed snapping rolls having a forward end with a spiral surface and a fluted rear end. The rolls are inclined from a low end at the forward end of the harvester to an upper rear end and consequently when the stalk first enters into the passage the augered or spiral end will aggressively move the stalk rearwardly and since there are very few ears on the lower portion of the stalks, the detachment of the ears will not occur in most instances until the stalk reaches the fluted end. It is an object of the invention to provide above the aforementioned type of snapping roll a pair of plates that have upper rear opposed edges closed together so that the ears cannot be drawn into the fluted or ribbed ends of the rolls but will be detached upon contacting the plates. At their forward ends, or the portion of the plates above the spiral portion of the snapping rolls, the opposed edges are spaced relatively widely apart so as to not obstruct the movement of the stalks both downwardly and rearwardly. The rear edges and forward edges of the plate structure are joined by inclined or angled edges.

It is further proposed to provide with the aforementioned type of harvester a means of discharging the detached ears rearwardly and out of the plant passage. The plates may operate as platforms. Positioned above the plates are gathering chains with the inner runs being positioned to contact the detached ears and moving them along the top surface of the plates into a rear discharge opening provided in a rear upright wall of the harvester housing. To aid in the passage of the ears through the opening is a transverse beater mechanism directly forwardly of the rear wall and adjacent the lower discharge opening.

Other objects and advantages of the present invention will become apparent to those skilled in the art as the nature of the invention is better understood from the following description and as shown in the accompanying drawings.

FIG. 1 is a forward perspective view of a corn harvester mounted on the forward end of a combine.

FIG. 2 is a plan view of the harvester roll and snapping plate assembly.

FIG. 3 is a sectional view taken substantially along the line 3—3 of FIG. 2.

FIG. 4 is a sectional view taken substantially along the line 4—4 of FIG. 2.

The harvester herein to be described is a corn head 14 supported on the forward end of a conventional type combine 10, the exact type of mounting not being important for the present invention. Also, it should be recognized that in many respects the present type of corn harvester, as well as the type of crop treating mechanism, is for illustrative purposes and the present invention could operate in many other and different environments of corn harvesters or harvesters in general. The combine 10 is composed of a forwardly positioned platform 11 having an operator's station as indicated by the operator's seat 12 and a steering column 13. As is conventional, power for operating the entire crop harvester 14 is supplied by the combine structure as is also the various mechanism for hydraulically controlling the position of the corn harvester.

The corn harvester 14 is composed of left- and right-hand housing structures 15, 16 each defining a pair of fore-and-aft extending stalk passages 17, 18 and 19, 20 so as to receive rows of corn stalks as the entire harvester advances over the field. The left-hand and right-hand housings 15, 16 have centered dividers or stilings 21, 22 positioned between the passages 17, 18 and 19, 20 respectively and terminate in forward gathering points flaring outwardly between the respective passages. Outside stilings 23, 24 are positioned outboard of the outboard passages 17, 20 and inboard stilings 25, 26 are positioned inboard of the inner passages 18, 19. The latter stilings 25, 26 are joined so as to define a center divider between adjacent pairs of rows of corn stalks. Housings 15, 16 are also provided with transverse generally upright walls 27, 28 having lower discharge openings 29, 30 extending across the transverse expanse of the plant passages 17, 18 and 19, 20 respectively. The discharge openings 29, 30 are provided so that ears of corn and other material passed by the harvesting mechanism will move through the discharge openings and into a suitable container or means for collecting the ear corn.

The rear end of the center dividers 21, 22 terminate spacedly forwardly of the rear walls 27, 28 so as to provide a space in which is supported a pair of transversely disposed beaters 31, 32 having flexible paddle wheels 33, 34. The beaters 31, 32 rotate about horizontal axes and are positioned forwardly of the walls 27, 28 and slightly above the rear ends of the plant passages 17, 18 and 19, 20 respectively. The beaters 31, 32 operate so that the flexible paddles 33, 34 contact the ears of corn moving off of the plant passages and aid in driving them through the discharge openings 29, 30.

Snapping rolls 40, 41 are supported on the housing structure in opposed relation and on opposite sides of the passages 17–20. The manner of mounting the rolls as well as the drive for rotating the rolls is of no importance relative to the present invention and may be similar in many respects to that shown and described in U.S. Patent 2,794,307 that issued to C. S. Morrison et al. June 4, 1957.

Forwardly extending roll points 42, 43 are connected to and rotate in unison with the rolls 40, 41. The rolls 40, 41 have forward end portions 44, 45 with spiral ribs or surfaces 46, 47 that cooperate with one another to auger the stalks and ears of corn rearwardly as the harvester advances. Since the forward portions 44, 45 will normally engage the lower portions of the stalks, the ears will not in most instances contact this portion of the rolls. However, should they contact the forward portions there will be sufficient aggressiveness to detach the ears and to auger the ears rearwardly.

The harvester rolls 40, 41 have rear portions 48, 49 with axially extending ribs or flutes 50, 51 that are more aggressive, as compared to the forward portions 44, 45, in their action of driving the stalks downwardly. The portions 44, 45 and the portions 48, 49 generally extend substantially one-half the length of the entire rolls 40, 41.

Supported on the housing structure 14 and above the rolls 40, 41 are plates 55, 56 disposed on opposite sides of the passage and having opposed edges, presently to be described in detail, on opposite sides of the respective passages. The plates 55, 56 have outwardly projecting ears 57, 58 at their forward ends and outwardly projecting ears 59, 60 at the rearward ends, each of the ears being provided with a slot so that the plates may be bolted, in suitable manner not shown, to the housing structure. The ears 57-60 are slotted so that adjustment of the plates 55, 56 may be made toward or away from one another.

The plates 55, 56 have rear portions 61, 62 substantially the length of the fluted rear ends 48, 49 of the snapping rolls 40, 41. The rear ends 61, 62 have opposed edges 63, 64 relatively close together so as to permit only a limited amount of trash to pass therebetween. The edges 63, 64 will, of course, prevent the ears detached from the stalks from passing downwardly. In operation the aggressive fluted ends 48, 59 of the rolls will drive the stalks downwardly at the rear end of the passages so that the ears will be snapped or detached therefrom and lie atop the plates 55, 56 at the rear portion of the passage.

The plates 55, 56 have forward ends 65, 66 substantially the length of the forward ends 44, 45 of the harvesting rolls 40, 41. The opposed edges 67, 68 at the forward end are spaced considerably apart so as to offer little obstruction to the stalks and material being moved by the spiral ends 44, 45 of the harvesting rolls 40, 41. The edges 63, 64 are joined with the edges 67, 68 respectively by intermediate outwardly and forwardly extending edges 69, 70 respectively, the latter edges operaing to provide a relatively smooth flow of stalks and material rearwardly without providing an obstruction on which stalks, trash and other material might catch.

A pair of gathering chains 71, 72 is supported on the housing above the plates 55, 56 and has inner runs on opposite sides of the respective passages 17-20. The lug portions 73, 74 of the inner runs move closely adjacent the upper surface of the plates 55, 56 and are staggered relative to one another so as to permit overlapping of the outer ends of the lugs 73, 74, such being shown in FIG. 1. The inner runs of the chains are flared outwardly at their forward ends so that overlapping of the lugs occurs only at the rear portion of the passage and generally above the rear portions 61, 62 of the plates.

The manner of mounting the chains on the harvester and the drive for the chains may be of a conventional type and may be similar to that shown in the aforementioned Morrison et al. patent.

The harvester operates in the following manner. Stalks are received in the passages 17-20 as the harvester advances. The chains 71, 72 as well as the spiraled forward ends 44, 45 of the rolls, aggressively move the stalks rearwardly while at the same time detaching the ears that are on the lower portions or fallen portions of the stalks. The chains 71, 72 also move the detached ears over the plates 55, 56. Also, the augering by the forward portions 44, 45 of the rolls rapidly clear the trash from the mouth of the corn picker. As the stalks approach the rear portions 48, 49 of the snapping rolls, a more aggressive downward action occurs and the majority or most of the ears are detached as they contact the rear portions 61, 62 of the plates. The lugs 73, 74 overlapping slightly at this part of the stalk passage operate as a conveyor moving the material over the plates 61, 62 until the material is discharged through the discharge openings 29, 30 in the rear walls 27, 28 of the housing.

While only one form of the invention has been shown, it should be recognized that other forms and variations may occur to those skilled in the art. Therefore while the particular form has been shown and described in detail for that purposes of clearly and concisely illustrating the principles of the invention, it is not intended to limit or narrow the invention beyond the broad concepts set forth in the appended claims.

What is claimed is:

1. Corn harvesting structure comprising: housing structure defining a plurality of fore-and-aft extending passages terminating at open rear ends and a rear upright transverse wall having material discharge opening means for passing material from the rear ends of the passages; snapping rolls supported on the housing structure in opposed relation on opposite sides of the passages and having forward ends with spiraled outer surfaces effective to auger material rearwardly and rear ends having axially extending lugs on their surfaces for aggressively drawing material downwardly; roll points forwardly of and connected to rotate with the forward ends of the rolls; laterally extending plates supported on the housing structure above the rolls and having opposed edges on opposite sides of the passages, each of the edges having a lower fore-and-aft extending portion above the spiraled end of the respective roll and an upper fore-and-aft extending portion above the aggressive rear end of the respective roll, the upper and lower edge portions of each plate being laterally offset from one another whereby the spacing between the edge portions above the spiraled forward ends is relatively wide so as to permit comparatively unobstructed movement of materials being moved by the spiraled forward ends and is relatively narrow above the aggressive rear ends of the rolls so as to limit downward movement of material between those portions of the plates; a pair of gathering chains above the plates and having opposed inner runs on opposite sides of the passages and closely adjacent the respective plates for moving material rearwardly in the passages; and transverse beater means at the rear of the passages forwardly of the wall and above the rear portions of the plates for moving material from atop the rear plate portions rearwardly through the discharge opening means.

2. Corn harvesting structure comprising: housing structure having a fore-and-aft extending material receiving passage; opposed rotating snapping rolls supported on the housing structure on opposite sides of the passage and having forward portions with spiraled outer surfaces effective to auger material rearwardly and integral rear portions having axially extending lugs on their surfaces for aggressively drawing material downwardly; roll points forwardly of and connected to rotate with the forward ends of the rolls; laterally extending plates supported on the housing structure above the rolls and having opposed edges on opposite sides of the passages, each of the edges having a lower fore-and-aft extending portion above the spiraled end of the respective roll and an upper fore-and-aft extending portion above the aggressive rear end of the respective roll, the upper and lower edge portions of each plate being laterally offset from one another whereby the spacing between the edge portions above the forward roll portions is relatively wide so as to permit comparatively unobstructed movement of materials being moved by the spiraled forward portions and is relatively narrow above the aggressive rear portions of the rolls so as to prevent downward movement of material between those portions of the plates; and a pair of gathering chains above the plates and having opposed inner runs on opposite sides of the passage and closely adjacent the respective plates for moving material rearwardly in the passage.

3. Corn harvesting structure comprising: housing structure having a fore-and-aft extending material receiving passage; opposed rotating snapping rolls supported on the housing structure on opposite sides of the passage and having forward portions with spiraled outer surfaces effective to auger material rearwardly and integral rear portions having axially extending lugs on their surfaces for aggressively drawing material downwardly; roll points fixed to rotate with the snapping rolls and extending forwardly of the forward portions; laterally extending plates supported on the housing structure above the rolls and having opposed edges on opposite sides of the passages, each of the edges having a lower fore-and-aft extending portion above the spiraled end of the respective roll and an upper fore-and-aft extending portion above the aggresssive rear end of the respective roll, the upper and lower edge portions of each plate being laterally offset from one another whereby the spacing between forward edge portions above the forward roll portions is relatively wide so as to permit comparatively unobstructed movemnet of materials being moved by the spiraled forward end portions, and the spacing between the rear edge portions is relatively narrow above the aggressive rear portions of the rolls so as to prevent downward movement of material between those portions of the plates, the plates further having intermediate edge portions diverging forwardly and outwardly from the rear to the front edge portions; and a pair of gathering chains above the plates and having opopsed inner runs on opposite sides of the passage and closely adjacent the respective plates for moving material rearwardly in the passage.

4. The invention defined in claim 3 further characterized by the chains having outwardly projecting lugs, and the inner runs of the chains being so disposed that the ends of the lugs overlap above the rear portions of the plates.

5. Corn harvesting structure comprising: housing structure having a fore-and-aft extending material receiving passage; opposed rotating snapping rolls supported on the housing structure on opposite sides of the passage and having forward portions with spiraled outer surfaces effective to auger material rearwardly and integral rear portions having axially extending lugs on their surfaces for aggressively drawing material downwardly; roll points fixed to rotate with the snapping rolls and extending forwardly of the forward portions; and laterally extending plates supported on the housing structure above the rolls and having opposed edges on opposite sides of the passages, each of the edges having a lower fore-and-aft extending portion above the spiraled end of the respective roll and an upper fore-and-aft extending portion above the aggressive rear end of the respective roll, the upper and lower edge portions of each plate being laterally offset from one another whereby the spacing between forward edge portions above the forward roll portions is relatively wide so as to permit comparatively unobstructed movement of materials being moved by the spiraled forward end portions, and the spacing between the rear edge portions is relatively narrow above the aggressive rear portions of the rolls so as to prevent downward movement of material between those portions of the plates, the plates further having intermediate edge portions diverging forwardly and outwardly from the rear to the front edge portions.

6. Corn harvesting structure comprising: housing structure defining a plurality of fore-and-aft extending passages terminating at open rear ends and having means for receiving material from the rear ends of the passages; snapping rolls supported on the housing structure in opposed relation on opposite sides of the passages and having forward ends with spiraled outer surfaces effective to auger material rearwardly and rear ends having axially extending lugs on their surfaces for aggressively drawing material downwardly; roll points fixed to rotate with the snapping rolls and extending forwardly of the forward portions; a pair of laterally extending plates supported on the housing structure above the rolls adjacent each passage and having opposed fore-and-aft extending edges on opposite sides of the passages, each of the edges having a lower portion above the spiraled end of the respective roll and an upper portion above the aggressive rear end of the respective roll, the upper and lower edge portions of each plate being laterally offset from one another whereby the spacing between the edge portions above the spiraled forward ends is relatively wide so as to permit comparatively unobstructed movement of materials being moved by the spiraled forward ends and is relatively narrow above the aggressive rear ends of the rolls so as to limit downward movement of material between those portions of the plates; a pair of gathering chains for each passage disposed above the plates and having opposed inner runs on opposite sides of the respective passages and closely adjacent the respective plate for moving material rearwardly; and transverse beater means at the rear of each passage for moving material from atop the rear plate portions rearwardly into the means for receiving the material.

References Cited by the Examiner
UNITED STATES PATENTS

| | | | |
|---|---|---|---|
| 1,102,227 | 7/14 | Baird | 56—105 |
| 2,542,646 | 2/51 | Fergason | 56—108 |
| 2,676,450 | 4/54 | Schaaf et al. | 56—18 X |
| 2,794,307 | 6/57 | Morrison et al. | 56—18 |
| 2,821,058 | 1/58 | Jones | 56—108 |
| 3,067,562 | 12/62 | Ashton et al. | 56—106 |

T. GRAHAM CRAVER, *Primary Examiner.*

ANTONIO F. GUIDA, ABRAHAM G. STONE, *Examiners.*